United States Patent [19]
Lee

[11] Patent Number: 5,721,653
[45] Date of Patent: Feb. 24, 1998

[54] HEAD BASE FOR GIVING AN AZIMUTH ANGLE TO A MAGNETIC GAP OF A HEAD FOR USE IN A VIDEO CASSETTE RECORDER

[75] Inventor: Byung-Kyu Lee, Seoul, Rep. of Korea

[73] Assignee: Daewoo Electronics Co., Ltd., Seoul, Rep. of Korea

[21] Appl. No.: 551,210

[22] Filed: Oct. 31, 1995

[30] Foreign Application Priority Data

Oct. 31, 1994 [KR] Rep. of Korea ............... 94-28299

[51] Int. Cl.$^6$ ............................. G11B 5/52; G11B 21/24
[52] U.S. Cl. ............................. 360/107; 360/109
[58] Field of Search ........................... 360/107, 109, 360/104, 77.16, 84, 130.24

[56] References Cited

U.S. PATENT DOCUMENTS

| | | | |
|---|---|---|---|
| 4,106,065 | 8/1978 | Ravizza | 360/109 |
| 4,203,140 | 5/1980 | Watanabe | 360/109 X |
| 4,236,185 | 11/1980 | Obremski | 360/109 X |
| 4,709,287 | 11/1987 | Yamashita | 360/109 |
| 5,047,882 | 9/1991 | Kawai et al. | 360/107 |
| 5,303,108 | 4/1994 | Higashionji et al. | 360/107 X |
| 5,543,990 | 8/1996 | Mizoh et al. | 360/107 X |

*Primary Examiner*—John H. Wolff
*Attorney, Agent, or Firm*—Anderson Kill & Olick, P.C.

[57] ABSTRACT

A head assembly for use in a video cassette recorder includes a head, the head having a magnetic gap, and a head base, the head base being divided into a first portion fixed on bottom surface of the rotary drum and a second portion having a front and a back sides, wherein the front side of the second portion of the head base is formed so as to have a predetermined angle of inclination, corresponding to the azimuth angle, with respect to the back side thereof.

2 Claims, 4 Drawing Sheets

1

HEAD BASE FOR GIVING AN AZIMUTH ANGLE TO A MAGNETIC GAP OF A HEAD FOR USE IN A VIDEO CASSETTE RECORDER

FIELD OF THE INVENTION

The present invention relates to a head drum assembly for use in a video cassette recorder ("VCR"); and, more particularly, to a head assembly with a head base capable of giving an azimuth angle to a gap of a head.

BACKGROUND OF THE INVENTION

In general, a VCR includes at least a pair of magnetic heads, each of the magnetic heads having a gap with an azimuth angle for canceling crosstalk in the luminance signal. The gaps in the pair of magnetic heads are canted 6° from the vertical in opposite directions for the VHS system, and 7° from the vertical in the Betamax system, respectively, the angle corresponding to the azimuth angle of respective system.

There is shown in FIG. 1 a part of prior art head drum assembly 100 illustrating a rotary drum 10 and a head assembly 20 which consists of a head 30 and a head base 40.

The head 30 has a pair of cores, i.e., a "T" shaped ferrite core 50 and a "C" shaped ferrite core 60. The "T" shaped ferrite core 50 and the "C" shaped ferrite core 60 are provided with face surfaces 50a, 60a, respectively. Each of the face surfaces 50a, 60a is plated with a magnetic metal film(not shown) beginning from a front abutment portion A to a rear abutment portion B.

The "T" shaped ferrite core 50 and the "C" shaped ferrite core 60 contact each other via $SiO_2$ film (not shown) or the like formed between the metal magnetic films in the front abutment portion A, thereby forming a magnetic gap 70. The "C" shaped ferrite core 60 has a groove 61 for winding a coil wire 62. The "T" shaped ferrite core 50 and the "C" shaped ferrite core 60 are bonded to each other with a bonding glass 80.

The head 30 is normally formed by cutting a magnetic core block 90 formed by bonding together a "T" shaped core block 91 and a "C" shaped core block 92. The azimuth angle θ to the magnetic gap 70 of the head is generated by slantly cutting the magnetic core block 90, as shown in FIG. 2. However, it is extremely difficult to obtain a precise azimuth angle using above described method.

SUMMARY OF THE INVENTION

It is, therefore, a primary object of the present invention to provide a head assembly with a head base capable of giving an azimuth angle to a gap of a head.

In accordance with one aspect of the present invention, there is provided a head drum assembly for use in a video cassette recorder, comprising: a rotary drum having a top and a bottom surfaces; one or more heads, each of the heads having a magnetic gap; and one or more head bases, each of the head bases divided into two portions, i.e., a first portion fixed on the bottom surface of the rotary drum and a second portion having a front and a back sides, wherein the front side of the second portion of the head base is formed so as to have a predetermined angle of inclination corresponding to an azimuth angle of the magnetic gap with respect to the back side thereof.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
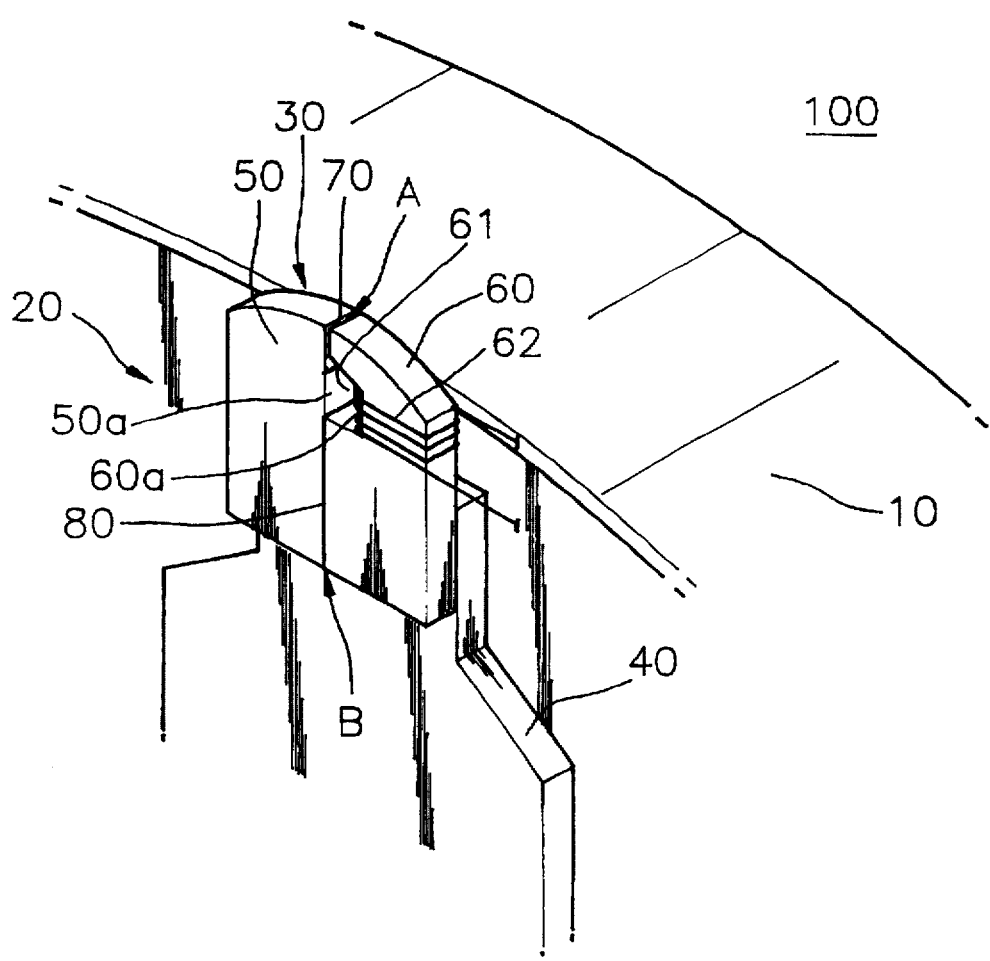
FIG. 1 presents a partial perspective view of a conventional head assembly.
Figure 2:
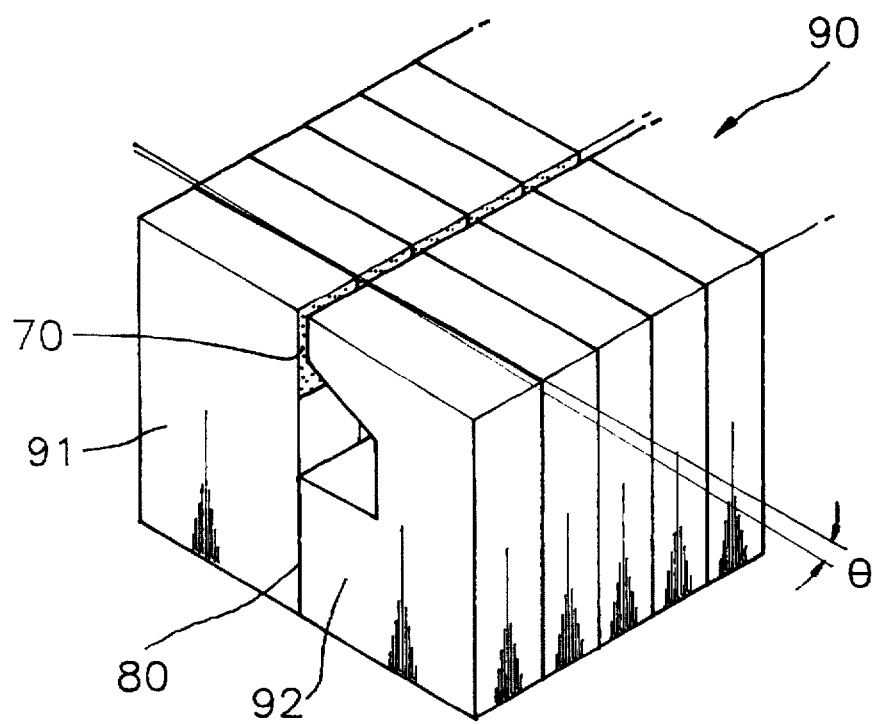
FIG. 2 are a perspective view illustrating a conventional method for forming a head.
Figure 3:
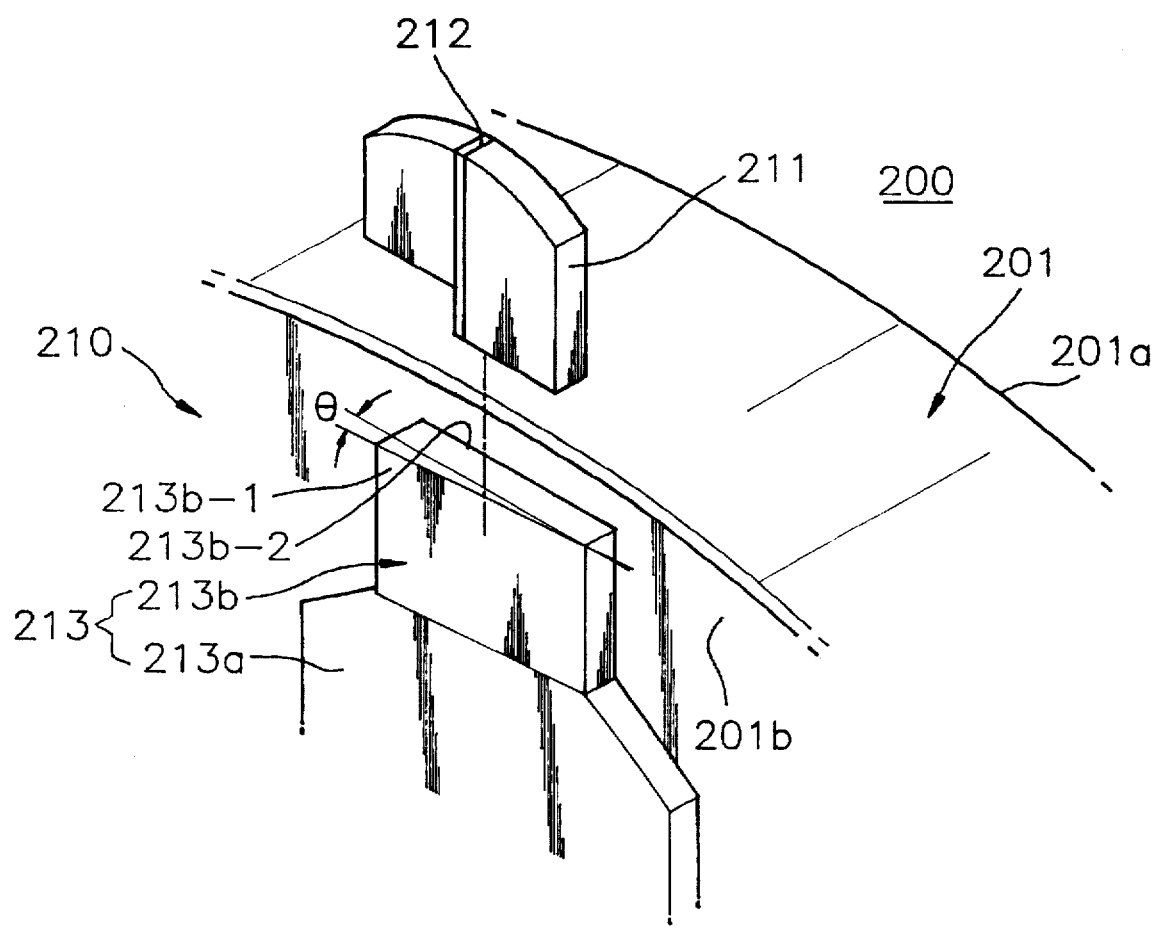
FIG. 3 shows an exploded bottom perspective view of the inventive head drum assembly.

Referring to FIG. 3, there is shown a bottom perspective view of a head drum assembly 200 for use in a VCR, illustrating a rotary drum 201 having a top and a bottom surfaces, 201a, 201b, and an inventive head assembly 210.

The head assembly 210 includes a head 211 having a magnetic gap 212 and a head base 213. The magnetic gap 212 of the head 211 is perpendicular to the bottom surface 201b of the rotary drum 201.

The head base 213 is divided into two portions, i.e., a first portion 213a for attaching the head base 213 to the bottom surface 201b of the rotary drum 201 and a second portion 213b having a front side 213b-1 for mounting the head 211 thereon and a back side 213b-2.

Furthermore, the front side 213b-1 of the second portion 213b of the head base 213 is canted or tilted to have a predetermined angle of inclination θ e.g., 6 degrees, with respect to the bottom surface 201b of the rotary drum 201 and the back side 213b-2 thereof has a parallel relationship with the bottom surface 201b of the rotary drum 201.

Figure 4:
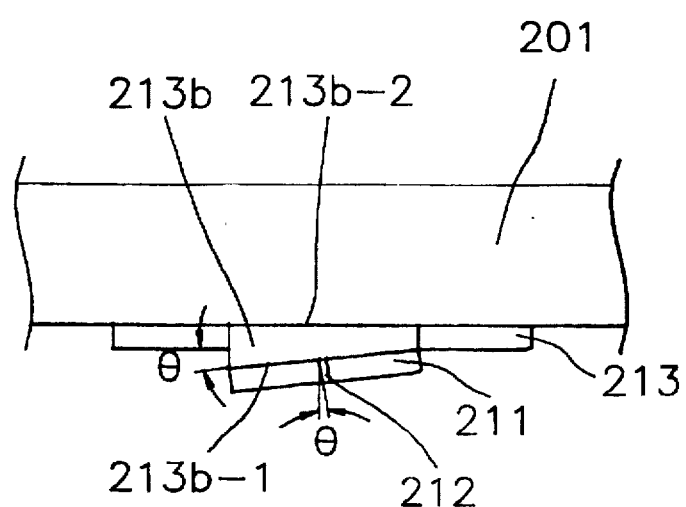
FIG. 4 represents a side view setting forth on how to give an azimuth angle to a magnetic gap of a head incorporated in the head assembly in accordance with the present invention.

As shown in FIG. 4, since the front side 213b-1 of the second portion 213b of the head base 213 is canted at the predetermined angle of inclination θ with respect to the bottom surface 201b of the rotary drum 201, the azimuth angle θ can be given to the magnetic gap 212 by simply mounting the head 211 on the front side 213b-1 of the second portion 213b of the head base 213. That is, the front side 213b-1 of the second portion 213b of the head base 213 serves to give the azimuth angle of the magnetic gap 212 of the head 211, when a head drum assembly incorporating therein the aforementioned head 211 is mounted on the deck (not shown) of the VCR.

Accordingly, by giving the angle of inclination θ corresponding to the azimuth angle to the head base instead of the head, it is possible to simplify the process for providing the azimuth angle in the head assembly.

Although the invention has been shown and described with respect to the preferred embodiments, it will be apparent to those skilled in the art that various changes and modifications may be made without departing from the scope of the invention as defined in the following claim.

What is claimed is:

1. A head drum assembly for use in a video cassette recorder, comprising:

a rotary drum having a top and a bottom surfaces;

one or more heads, each of the heads having a magnetic gap perpendicular to the bottom surface of the rotary drum; and one or more head bases, each of the head bases divided into a first portion for attaching the head base to the bottom surface of the rotary drum and a second portion having a front side for mounting the head thereon and a back side, wherein the front side of the second portion of the head base is canted to have a predetermined angle of inclination with respect to the bottom surface of the rotary drum and the back side thereof is formed in a parallel relationship with the bottom surface of the rotary drum.

2. The head drum assembly of claim 1, wherein the front side of the second portion of the head base is canted approximately 6 degrees with respect to the bottom surface of the rotary drum.

* * * * *